United States Patent [19]

Ha

[11] Patent Number: 5,759,465

[45] Date of Patent: Jun. 2, 1998

[54] METHOD AND APPARATUS FOR RECYCLING WASTE RESIN PRODUCTS COATED WITH FOREIGN MATERIAL FILMS

[75] Inventor: Su-Hyun Ha, Kwangmyung-shi, Rep. of Korea

[73] Assignee: KIA Motors Corporation, Seoul, Rep. of Korea

[21] Appl. No.: 556,602

[22] Filed: Nov. 13, 1995

[30] Foreign Application Priority Data

Apr. 15, 1995 [KR] Rep. of Korea .................... 95-8895

[51] Int. Cl.⁶ .................................................. B29B 9/02
[52] U.S. Cl. .......................... 264/141; 241/3; 241/24.18; 241/24.28; 264/37; 264/DIG. 69; 425/311
[58] Field of Search .................... 264/141, DIG. 69, 264/37, 118; 425/308, 311; 241/3, 24.18, 24.28

[56] References Cited

U.S. PATENT DOCUMENTS

| | | | |
|---|---|---|---|
| 3,819,773 | 6/1974 | Pears | 264/141 |
| 5,304,276 | 4/1994 | MacLeod et al. | 264/37 |
| 5,323,971 | 6/1994 | Nishibori et al. | 241/3 |
| 5,458,829 | 10/1995 | Ikeda et al. | 264/37 |
| 5,476,624 | 12/1995 | Sato et al. | 264/37 |
| 5,539,004 | 7/1996 | Ikeda et al. | 264/37 |

FOREIGN PATENT DOCUMENTS

| | | | |
|---|---|---|---|
| 141133 | 4/1980 | Germany | 264/37 |
| 57-89924 | 6/1982 | Japan | 264/37 |
| 6-134759 | 5/1994 | Japan | 264/37 |

*Primary Examiner*—Jeffery R. Thurlow

[57] ABSTRACT

A method and apparatus for recycling waste resin products are disclosed in which a shearing force is produced from pulverized small pieces due to the rotation speed difference of rollers by making the small pieces pass between the rollers rotated at different speeds. The shearing force is applied to both sides of the small pieces at different magnitudes. Foreign material films are separated from the small pieces due to the shearing stress difference between the small pieces and the films coated thereon. Additionally, the small pieces are passed through a secondary pulverizer rotated at a high speed to be thereby pulverized secondarily into a predetermined size, whereby the foreign material films are completely separated from the small pieces.

13 Claims, 5 Drawing Sheets

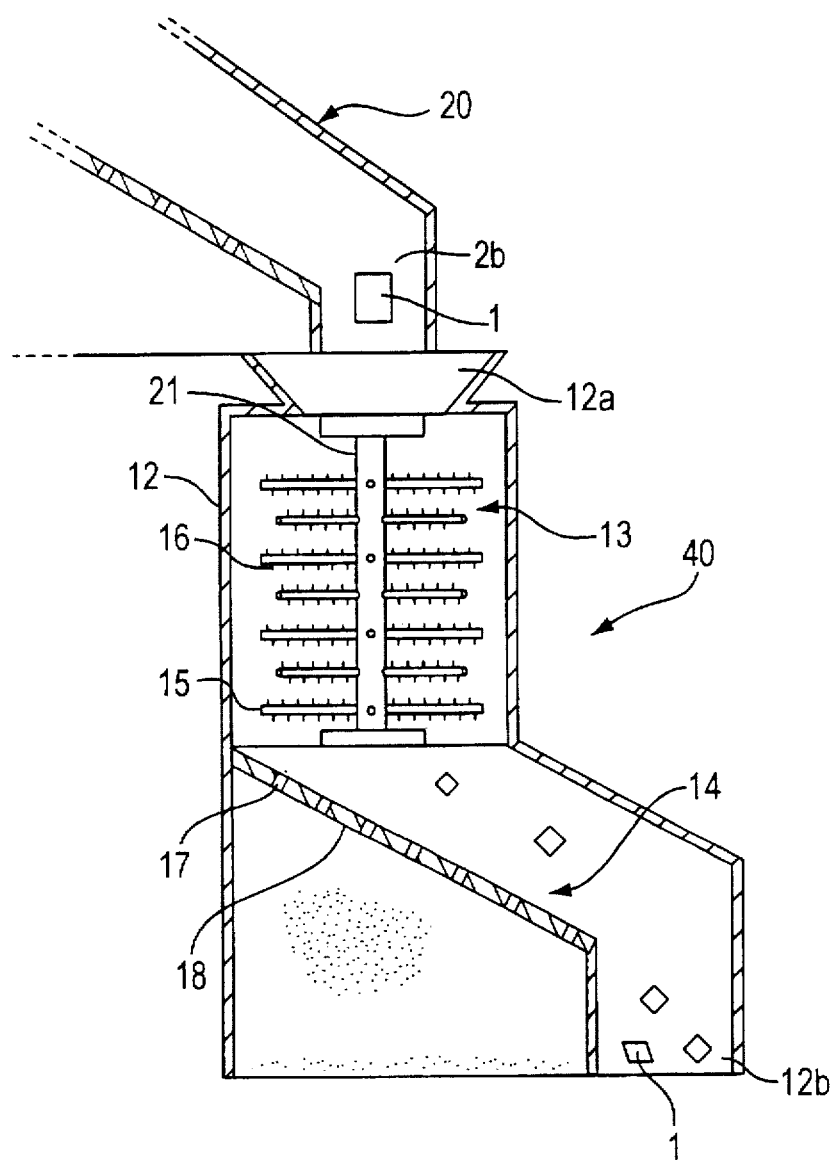

5,759,465

METHOD AND APPARATUS FOR RECYCLING WASTE RESIN PRODUCTS COATED WITH FOREIGN MATERIAL FILMS

BACKGROUND OF THE INVENTION

The present invention relates to a method and apparatus for recycling waste resin products such as vehicle bumpers to be discarded as waste, and a method and apparatus for recycling the waste resin products coated with foreign materials such as paint.

PRIOR ART

Recently, in view of preventing environmental pollution, many countries have been establishing laws according to which in order for companies to sell their products, they must withdraw waste goods discarded, especially, waste resin articles manufactured of materials such as plastic. In other words, the government requests companies to collect their waste goods, for preventing environmental pollution due to discarded chemical products such as waste resin articles, which became social problems. For the companies, in order to conform with the laws and at the same time, reduce production cost by recycling resources, various developments and studies on withdrawal and recycling of wastegoods are being carried out.

In processing waste goods, especially, in collecting and recycling the waste resin products disposed, it is important to extract pure resin to be used for recycling from the waste resin products discarded. For instance, in case that a vehicle bumper is to be recycled, a foreign material film coated on its surface to protect it must be separated and removed from the bumper. Then, the bumper must be pulverized into small pieces to be collected as resin material.

Separating and removing the foreign material film coated on the surface of the bumper is performed because if, for instance, paint is contained in the finally collected and recycled resin material, the physical properties of the finally manufactured article are affected to thus decrease the quality of the products. For this reason, the foreign material film coated on the surface of resin products must be removed in recycling them.

For conventional methods of removing such foreign material film from, for instance, a bumper, there were proposed a mechanical method like shot blast, and a chemical method in which the coated bumper is immersed in a chemical solution to etch and remove its foreign material film. After the foreign material film is removed from the bumper according to these methods, the waste resin products free from the foreign material film is pulverized into resin materials of a predetermined diameter (usually about 5 mm), and the pulverized resin materials are extruded and pelletized so that the resin materials are reused in manufacturing bumpers.

However, the mechanical and chemical methods must be used a separate device, thereby complicating process and thus decreasing working efficiency. Particularly, the chemical method results in pollution due to chemical solutions used thereto.

As an answer for the methods, there was presented U.S. Pat. No. 5,323,971 filed by Nishibori et al. and registered on 28 Jun., 1994, entitled "Pulverizing, separating and size regulating for waste resin article molded".

Nishibori et al. invention is made such that the waste resin products are pulverized into small pieces, and these small pieces pulverized for squeezing alternately receive the compression impacts caused by fine vibration of a fine vibration impact member, while passing through it. Through this process, the coated portion of the resin film is separated and removed from the surface of the small pieces.

According to Nishibori et al. invention, the foreign material film is removed from the surface of the article in such a manner that the film to be removed is detached from the surface by applying the fine vibration impacts to the surface of the article. However, in Nishibori et al. invention, the separation amount of the foreign material film from the surface of article are very small, therefore the step of applying fine vibration compression impacts to the surface of the article must be repeated to remove completely the film from the surface of resin products. This spends a lot of time on removing the layer from the resin products.

Therefore, it is an object of the present invention to provide a method for recycling waste resin products coated with a foreign material film on its surface in which relatively short time to separate the foreign material film from the waste resin products is spent, the foreign material film is separated from, for instance, a bumper, and at the same, the separated foreign material films are collected from the bumper.

It is another object of the present invention to provide apparatus for carrying out the above described method.

SUMMARY OF THE INVENTION

In accordance with a aspect of the present invention, there is provided a method for recycling waste resin products comprising the steps of: crushing waste resin products to be processed into a plurality of small pieces; separating a foreign material film coated on the surface of the small pieces crushed, and collecting the separated foreign material film and dust; secondary pulverizing the small pieces from which the foreign material film is separated, and completely separating the foreign material film from the small pieces from which the foreign material film is not separated yet, in the foreign material film separating step, into particles of a predetermined diameter, and simultaneously, recollecting the separated foreign material film and recovering pure resin material; and extruding and pelletizing the particles of the small pieces.

In accordance with another aspect of the present invention, there is provided an apparatus for recycling waste resin products, which comprising, means for crushing waste resin products to be processed into a plurality of small pieces; means for separating a foreign material film coated on the surface of the small pieces crushed, and collecting the separated foreign material film and dust; means for secondary pulverizing the small pieces from which the foreign material film is separated, and completely separating the foreign material film from the small pieces from which the foreign material film is not separated yet, in the foreign material film separating step, into particles of a predetermined diameter, and simultaneously, recollecting the separated foreign material film and recovering pure resin material; and means for extruding and pelletizing the particles of the small pieces.

BRIEF DESCRIPTION OF THE ATTACHED DRAWINGS

FIG. 1 shows a process of recycling waste resin products according to the present invention;

FIG. 2 schematically illustrates a state in which the waste resin products are pulverized by a usual pulverizer;

FIG. 3A schematically illustrates a foreign material film separating device according to the present invention;

FIG. 3B schematically illustrates the surface shape of the rollers of the foreign material film separating device of FIG. 3A;

FIG. 4A schematically illustrates the separated state of foreign material film from the small piece when the small pieces are passed through the rollers of the foreign material film separating device shown in FIGS. 3A and 3B;

FIG. 5 illustrates one embodiment of a secondary pulverizer of the present invention shown in FIG. 1;

DETAILED DESCRIPTION OF THE INVENTION

Hereinafter, a preferred embodiment of the present invention will be described in detail with reference to the attached drawings.

Figure 1:
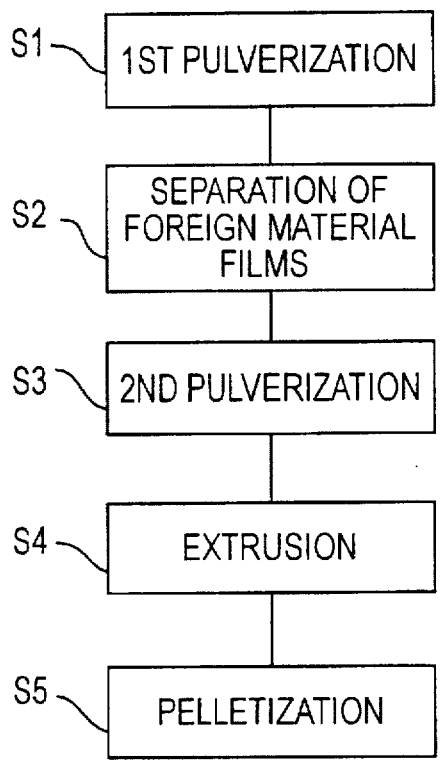

Referring to FIG. 1, waste resin products to be processed is crushed, in step S1, into small pieces of, for instance, 1–2 cm, by a pulverizer. In step S2, the foreign material film coated on the surface of the small pieces is separated and removed therefrom, using a foreign material film separating device. Here, in order to cool friction heat produced from rollers of the foreign material film separating device when they separate the foreign material film from the small piece, cooling water are injected to the roller from cooling water injection means placed above the rollers. The separated foreign material films and the cooling water are collected by a collecting means of the foreign material film separating means. In step S3, the small pieces, passing through step separating the foreign material film therefrom, are additionally pulverized by a secondary pulverizer into particles of about 5 mm diameter. Here, the foreign material film not separated by the foreign material film separating device is completely removed from the small pieces. The foreign material films separated from the small pieces are collected by the collecting means of the secondary pulverizer. The resin materials are sent to an extruder in step S4 and pelletized for processing in step S5.

Figure 2:
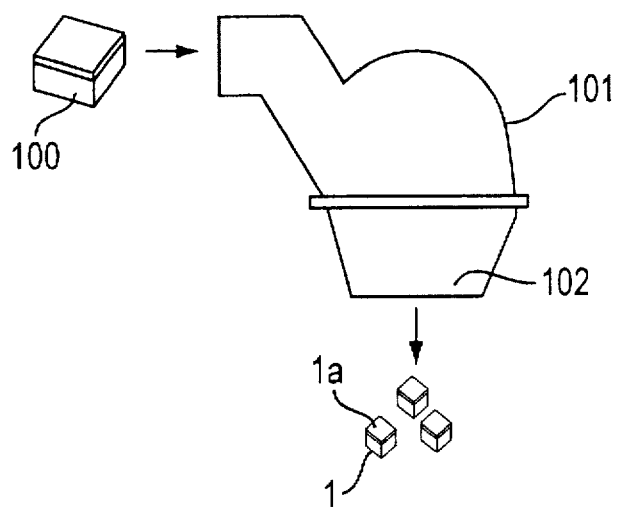

As shown in FIG. 2, waste resin products 100 are crushed into small pieces 1 having size of about 1–2 cm by a cutter mill or pulverizer 101. Here, the foreign material film 1a such as paint is coate d on a surface of a small piece 1.

Figure 3A:
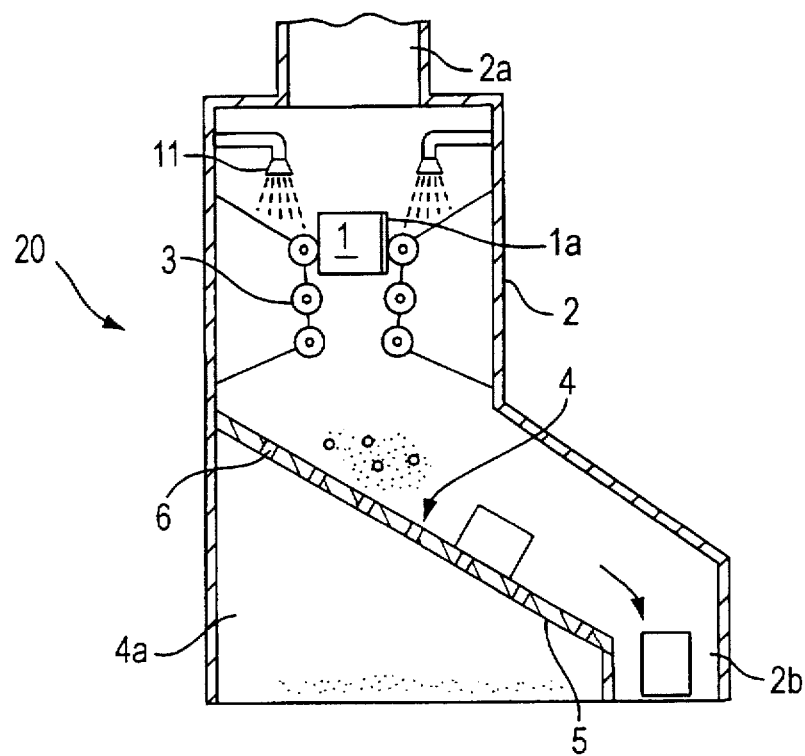
Figure 3B:
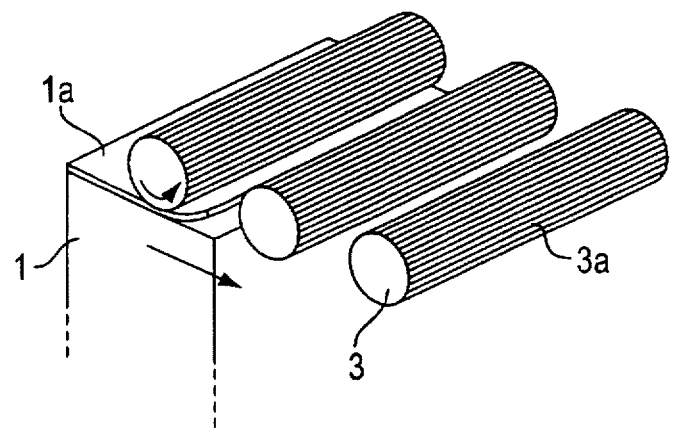

The foreign material film 1a is separated from the small piece 1 by foreign material film separating means 20, as shown in FIGS. 3A and 3B. Foreign material film separating means 20 comprises a main body 2 having an inlet 2a into which small pieces 1 are inserted, and an outlet 2b for discharging small pieces 1 from which the foreign material film 1a is separated, and at least one pair of rollers 3 for separating the foreign material film from the small piece 1, which are rotated at different rotation speeds and installed oppositely in the main body 2 by a predetermined distance. Also, the foreign material film separating means 20 has, disposed above rollers 3, cooling water injection means 11 for injecting cooling water toward rollers 3 in order to cool friction heat produced from the rollers 3 in film separation.

The inlet 2a of the main body 2 is placed under an outlet 102 of the pulverizer 101 shown in FIG. 2 so that the small pieces 1 discharge from the pulverizer 101 fall freely due to gravity and enter the main body 2. The outlet 2b is placed under the rollers 3 so that the small pieces 1 from which foreign material film 1a is separated fall freely and are discharged out of the foreign material film separating means 20 by gravity.

Figure 4A:
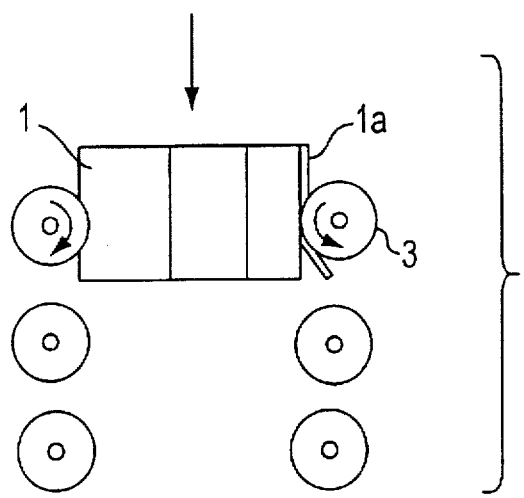
FIG. 4B is a graph of showing the relationship between rotation speeds and shearing forces applied to the small pieces.

In the foreign material film separating means 20, while the small pieces 1 crushed into a predetermined size by the pulverizer 101 pass through at least one pair of oppositely disposed foreign material film separating rollers 3, different rotation forces are applied to both sides of the small pieces 1 by a differential rotation speeds of the rollers 3. Therefore, a shearing force is acted, by the differential rotation speeds of the rollers 3, between the small pieces 1 and the foreign material film 1a coated thereto in the rotation direction (the proceeding direction of the small pieces 1) of the rollers 3, as shown in FIG. 4A. Due to the difference of shearing stresses of the small pieces 1 and the foreign material film 1a, the foreign material film 1a having a smaller shearing force is separated from the small pieces 1.

Figure 4B:
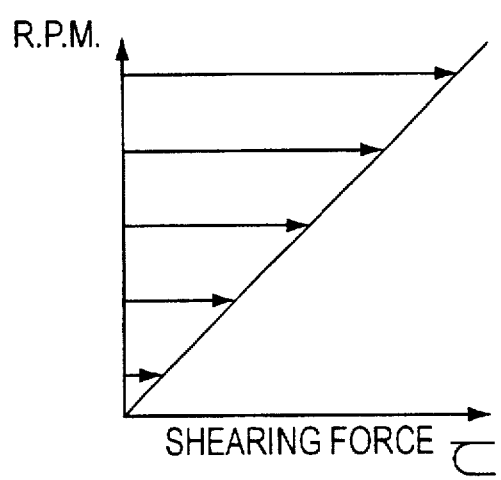

As shown in FIG. 4B, the shearing force is gradually increased toward one, having a greater rotation speed, of the rollers 3. With this shearing force, the foreign material film 1a having a smaller shearing stress is separated from the small pieces 1.

Here, cooling water injected from cooling water injection means 11 cool the small pieces 1 and the foreign material film 1a as well as the rollers 3, preventing the foreign material film 1a from being attached on the surface of the rollers 3 and accelerating the separation of the foreign material film 1a from the small pieces 1.

A plurality of pairs of rollers 3 are oppositely disposed in such a manner that their distance becomes narrower along the path along which the small pieces 1 pass. This enhances the effect of separation of the foreign material film 1a from the small pieces 1.

Slip preventing portions 3a are formed on the surface of the rollers 3, preventing the small pieces 1 from being slipped from rollers 3 when they pass through the rollers 3. Therefore, the rollers 3 are able to transmit more effective rotation forces to small pieces 1 by the slip preventing portions 3a formed on the surface of the rollers 3. This further increases the separation efficiency of the foreign material film 1a from the small pieces 1. The slip preventing portion 3a have various uneven structures. For instance, there may be formed a plurality of straight grooves formed longitudinally along the rollers 3, biased grooves inclined toward any side thereof, cross-shaped grooves, or a plurality of protrusions, with a predetermined interval.

The distance or the slip preventing portion of the foreign material film separating rollers 3 may be modified according to the size or the shape of small pieces 1 to be processed.

The collecting means 4 of the foreign material film separating means 20 divides the inside of the main body 2 vertically, forming a first collecting portion 4a of a predetermined size. A filtering screen 5 on which a plurality of holes 6 through which the foreign material film 1a separated from the small pieces and cooling water pass are formed is installed obliquely toward the outlet 2b of the main body 2. The foreign material film 1a and cooling water fall by gravity and are collected in the first collecting portion 4a through the holes 6 of the filtering screen 5. On the one hand, in the step for separating the foreign material film from the small piece 1, the foreign material film 1a may not be removed completely from the small piece 1.

However, by the secondary pulverizer of the present invention, the foreign material film 1a can be completely removed from the small pieces 1 on which the foreign material film 1a is attached. The small pieces 1 from which foreign material film 1a is separated in the foreign material film separating step and also the small pieces 1 from which the foreign material film 1a is not yet separated fall continuously down by gravity into the secondary pulverizer 40 shown in FIG. 5 through the outlet 2b of the foreign material film separating means 20.

As shown in FIG. 5, the secondary pulverizer 40 of the present invention includes a case 12 placed below the outlet 2b of the foreign material film separating means 20 and an inlet 12a formed at an upper side thereof, through which the small pieces 1 enter it, and an outlet 12b formed at a lower side thereof, for discharging pulverized resin material.

A pulverizing means 13 is disposed within the case 12 so that small pieces 1 falling down through the inlet 12a are secondary pulverized into a predetermined size of about 5 mm. Here, the foreign material films 1a not separated from the small pieces 1 are completely removed from the small pieces 1, and the cooling water contained on their surfaces are completely removed. The foreign material films 1a and the cooling water contained in the small pieces 1 repulverized by the pulverizing means 13 are collected in secondary collecting means 14 provided under the case 12.

The secondary collecting means 14 is formed in a predetermined size by dividing the inside of the case 12 of the secondary pulverizer 40. A filtering screen 18 having a plurality of holes 17, through which the foreign material films 1a separated from the small pieces 1 and the cooling water by the pulverizing means 13 pass, is mounted below the pulverizing means 13 to be directed toward the outlet 12b of the case 12. The holes 17 of the filtering screen 18 are preferably smaller than the holes 6 of the filtering screen 5 provided in the foreign material film separating means 20.

Figure 6:
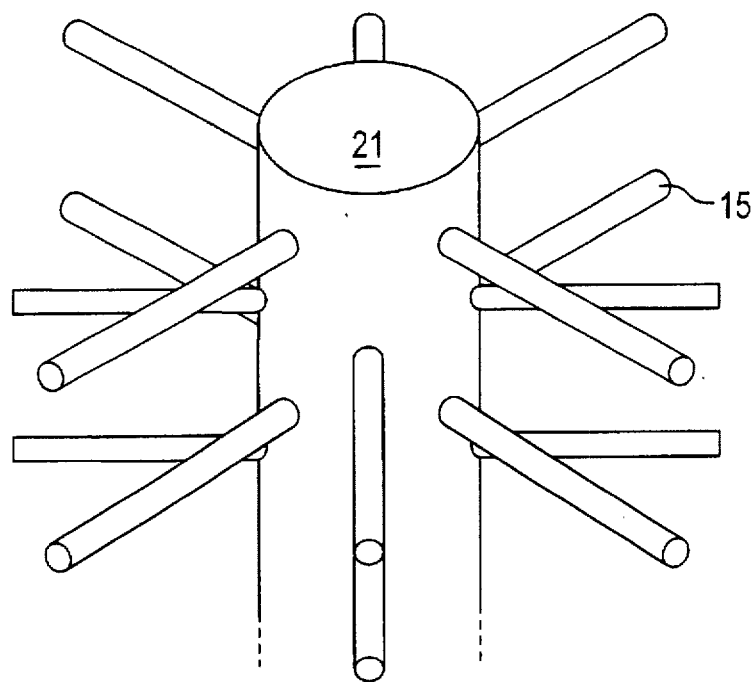
FIG. 6 is a perspective view of the foreign material film separating/pulverizing means of the pulverizer shown in FIG. 5.

More specifically, as shown in FIG. 6, the pulverizing means 13 includes multilevels of pulverizing blade support shafts 15 arranged vertically and radially along a rotation shaft 21 to be rotated centering on the rotation shaft 21 rotatably supported to the case 12.

One level of the pulverizing blade support shafts 15 are installed radially by 4 to 6 centering on the rotation shaft 21 and disposed alternately with other level of pulverizing blade support shafts 15, therefore the small pieces 1 continuously are collided with the pulverizing blade support shafts 15 while passing through the pulverizing blade support shafts 15, so that they are additionally pulverized by a plurality of pulverizing blades 16 formed on the circumference of each of the pulverizing blade support shaft 15.

A rotation shaft 21 rotates at a high speed of about 800–1000 rpm, so that the small pieces 1 falling down by gravity are secondary pulverized into a smaller size by colliding with the pulverizing blades 16 while passing through a plurality of pulverizing blade support shafts 15. Here, the foreign material films 1a not separated from the small pieces 1 and the cooling water can be completely separated and removed from the small pieces 1.

Figure 7:
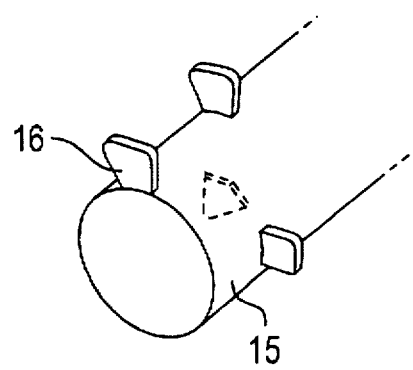
FIG. 7 is a front view of the pulverizing blades of the foreign material separating/pulverizing means shown in FIG. 6.

As shown in FIG. 7, the pulverizing blades 16 are formed protrudently and radially by 4 to 6 on the circumference of each of pulverizing blade support shaft 15 in the form of circle or spiral, so as to have a predetermined direction. The number and direction of the pulverizing blades 16 may be selected according to the shape of small pieces 1 to be processed. As described above, the pulverizing blades 16 may be arranged in the form of circle or spiral on each of pulverizing blade support shaft 15.

The small pieces 1, from which the foreign material film is separated, pulverized into particles of a smaller diameter by the secondary pulverizer are sent to a pelletizer to be pelletized through a well-known process so that the small pieces are used as resin material.

As described above, the method and the apparatus for recycling the waste resin products can facilitate separation and removal of a foreign material film such as paint from a resin product like a vehicle bumper to be discarded. In addition, the present invention is capable of continuously performing the recycling processes, enhancing the working efficiency in recycling resin.

Further, the foreign material film separating means of the present invention can apply different shearing forces to both sides of the small pieces to thereby separate the foreign material film from the small pieces by making the small pieces on which the foreign material film is coated pass through the pair of rollers rotating at different speeds. Accordingly, the surface separation of the foreign material film from the small pieces occurs so that the foreign material film can be effectively separated from the small pieces and that the separated foreign material film can be collected and discarded, to thereby facilitate recycling working.

What is claimed is:

1. A method for recycling a waste resin products coated with a foreign material film, comprising the steps of:

crushing said waste resin product to be processed into a plurality of small pieces;

separating said foreign material film coated on surfaces of the crushed small pieces from said pieces, while said small pieces pass through at least one pair of rollers which are rotated at different rotation speeds, and collecting the separated foreign material film and dust resulting from the separating step; and pulverizing the small pieces from which the foreign material film is separate to substantially separate residual foreign material film from the small pieces from which the foreign material film is not yet separated in the foreign material film separating step, while simultaneously pulverizing said pieces into particles of a predetermined diameter and recollecting the separated foreign material film; and extruding and pelletizing the particles of the small pieces separated from the foreign material film.

2. An apparatus for recycling waste resin products coated with a foreign material film, comprising:

means for crushing said waste resin products to be processed into a plurality of small pieces;

means for separating said foreign material film coated on the surface of the crushed small pieces from said pieces, said separating means including at least one pair of rollers which are rotated at different rotation speeds, and means for collecting the separated foreign material film and dust resulting from the separation of the small pieces and foreign material film;

means for pulverizing the small pieces from which the foreign material film is separate to substantially separate residual foreign material film from the small pieces from which the foreign material film is not yet separated while pulverizing said pieces into particles of a predetermined diameter and recollecting the separated foreign material film; and means for extruding and pelletizing the particles of the small pieces separated from the foreign material film.

3. The apparatus for recycling waste resin products, as claimed in claim 2, wherein said means for separating and collecting a foreign material film comprises:

a main body having an inlet for receiving the small pieces crushed from said crushing means and an outlet for discharging the small pieces;

at least one pair of foreign material film separating rollers installed oppositely in the main body with a predetermined distance and applying differential rotating forces to both sides of the small pieces at different speeds, to thereby separate the foreign material film from the small pieces by shearing force produced due to the differential rotating forces applied to both sides of the small pieces;

a cooling water injecting means placed above the rollers and for injecting cooling water to thereby cool friction heat produced from the rollers when the small pieces pass through the rollers; and a first collecting means for collecting the foreign material films separated from the small pieces by the foreign material film separating rollers and cooling water.

4. The apparatus for recycling waste resin products, as claimed in claim 2, wherein said foreign material film separating rollers has, on their circumferences, slip preventing portions for preventing the small pieces from being slipped.

5. The apparatus for recycling waste resin products, as claimed in claim 2, wherein said first collecting means has a first collecting portion of a predetermined size by dividing vertically the inside of the main body, and a filtering screen having a plurality of holes, through which the foreign material film separated from the small pieces and cooling water pass, installed above the first collecting portion and obliquely toward the outlet of the main body.

6. The apparatus for recycling waste resin products, as claimed in claim 2, said means for secondary pulverizing the small pieces comprises:

a case having an inlet placed under the foreign material film separating device and an outlet for discharging the repulverized small pieces;

a pulverizing means installed in the main body and for secondarily pulverizing the small pieces falling down by gravity through the inlet of the case by rotating at a high speed, and at the same time, additionally separating the foreign material film not yet separated from the small pieces by applying impacts to the small pieces; and a second collecting means for collecting the foreign material film and cooling water removed from the small pieces repulverized by the pulverizing means.

7. The apparatus for recycling waste resin products, as claimed in claim 6, wherein said pulverizing means comprises multilevels of pulverizing blade support shafts arranged radially and vertically along said rotation shaft to be rotated centering on rotation shaft rotatably supported to said case, and one level of said pulverizing blade support shafts are installed radially by 4 to 6 centering on each of said rotation shaft and disposed alternately with other level of said pulverizing blade support shafts.

8. The apparatus for recycling waste resin products, as claimed in claim 6, wherein said pulverizing blades are protrudently formed radially at each of said pulverizing blade support shaft to thereby have a predetermined direction.

9. The apparatus for recycling waste resin products, as claimed in claim 7, wherein said pulverizing blades are arranged in the form of circle on the circumference of each of said pulverizing blade support shafts by 4 to 6.

10. The apparatus for recycling waste resin products, as claimed in claim 6, wherein said pulverizing blades are arranged in the form of spiral on the circumference of each of said pulverizing blade support shaft by 4 to 6.

11. The apparatus for recycling waste resin products, as claimed in claim 7, wherein said pulverizing means rotates at 800–1000 rpm.

12. The apparatus for recycling waste resin products, as claimed in of claim 6, wherein said second collecting means has a second collecting portion of a predetermined size by dividing vertically the inside of the main body, and a filtering screen having a plurality of holes through which the foreign material films separated from the small pieces and cooling water is installed above the second collecting portion and inclined toward the outlet of the main body.

13. An apparatus for recycling waste resin products coated with a foreign material film, comprising:

means for crushing said waste resin products to be processed into a plurality of small pieces;

a separating and collecting apparatus including:

a main body having an inlet for receiving the small pieces crushed from said crushing means and an outlet for discharging the small pieces;

at least one pair of foreign material film separating roller means installed oppositely in the main body with a predetermined distance therebetween for applying differential rotating forces to both sides of the small pieces at different speeds, to thereby separate the foreign material film from the small pieces by shearing force produced due to the differential rotating forces applied to both sides of the small pieces;

a cooling water apparatus placed above the rollers for injecting cooling water produced by the rollers when the small pieces pass through the rollers; and a first collecting means for collecting the foreign material film separated from the small pieces by the foreign material film separating rollers and cooling water;

a pulverizer including a case having an inlet placed under the foreign material film separating and collecting apparatus and an outlet for discharging the pulverized small pieces;

a pulverizing means installed in the main body for secondarily pulverizing the small pieces falling out by gravity through the inlet of the case by rotating at a high speed and at the same time, additionally separating the foreign material film not yet separated from the small pieces by applying impacts to the small pieces; and a second collecting means for collecting the foreign material film and cooling water removed from the small pieces repulverized by the pulverizing means.

* * * * *